United States Patent
Millet et al.

[11] Patent Number: 6,047,474
[45] Date of Patent: Apr. 11, 2000

[54] METHOD OF MANUFACTURING A BIMETALLIC TURBINE BLADE AND USE THEREOF

[75] Inventors: Francois Millet; Daniel LeRoy, both of Le Creusot, France

[73] Assignee: Framatome, Courbevoie, France

[21] Appl. No.: 09/181,877

[22] Filed: Oct. 29, 1998

[30] Foreign Application Priority Data

Nov. 25, 1997 [FR] France .................. 97 14 791

[51] Int. Cl.[7] .................. B21D 39/03
[52] U.S. Cl. .................. 29/889.7; 29/889.71; 29/889.6; 29/558
[58] Field of Search .................. 29/889.7, 889.71, 29/889.6, 889, 428, 557, 558

[56] References Cited

U.S. PATENT DOCUMENTS

| 5,062,205 | 11/1991 | Fraser ..................... 29/889.7 |
| 5,183,390 | 2/1993 | Amos ..................... 416/224 |
| 5,351,395 | 10/1994 | Crawmer et al. ..................... 29/889.7 |

FOREIGN PATENT DOCUMENTS

| 0 605 152 | 7/1994 | European Pat. Off. ........ B23P 15/04 |
| 1 253 187 | 10/1971 | United Kingdom . |
| 2 071 778 | 9/1981 | United Kingdom .............. F01D 5/18 |

OTHER PUBLICATIONS

Gonserovskii, F.G., et al., "Efficiency of welding methods for repairing steam turbine blades and hardening their inlet edges," Welding Intl., vol. 8, No. 5, Jan. 1, 1994, pp. 390–393.

*Primary Examiner*—Irene Cuda
*Attorney, Agent, or Firm*—Pollock Vande Sande & Amernick

[57] ABSTRACT

A receiving cavity having a simple geometrical shape is machined in a metallic block having a simple geometrical shape made of a first metallic material. A member made of the second material is made and fixed into the cavity to produce a composite bimetallic block, and the turbine blade is machined from the composite block, the body of the blade being machined from the metallic block made of the first material and the insert being machined from the member of simple shape made of the second material. The member made of the second material can be prefabricated and welded into the cavity of made by depositing and solidifying a molten metal in the cavity. The invention applies in particular to manufacturing a blade of a low-pressure stage of a steam turbine.

13 Claims, 3 Drawing Sheets

METHOD OF MANUFACTURING A BIMETALLIC TURBINE BLADE AND USE THEREOF

FIELD OF THE INVENTION

The invention concerns a method of manufacturing a bimetallic turbine blade, and in particular a steam turbine blade intended for the low-pressure stage of the steam turbine.

BACKGROUND OF THE INVENTION

Rotating machines such as steam turbines have profiled blades mounted on fixed or rotating parts of the machines that come into contact with a fluid flowing through the machine at very high speed when the machine is operating.

The blades of rotating machines have a leading edge facing towards the flow of the fluid impinging on the blades of the machine and a trailing edge towards the rear of the blade with reference to the direction of flow of the fluid.

In some cases, the blade of the rotating machine is heavily eroded by the fluid flowing in the vicinity of its leading edge.

In particular, in steam turbines, the blades of the final stage or stages of the turbine, i.e., the low-pressure stages, are subject to heavy erosion in the vicinity of their leading edge because the steam then has a high moisture content and conveys droplets of water that impact on the leading edge of the blade. The contact of the water droplets with the leading edge of the blade produces a phenomenon of erosion that causes loss of metal from the blade in a portion near its leading edge. After steam turbines have been operating for some time, a lack of balance of the rotor assembly can result from asymmetric wear of the blades of the rotor of the low-pressure stages of the turbines. This imbalance encourages vibrations leading to repetitive stresses on the rotor which can become dangerous and cause the rotor to break up.

If such vibrations are observed, it is essential to stop the turbine and therefore the installation including the turbine.

Very high operating losses can result from this stoppage in vast installations such as nuclear or thermal power stations.

The rotor blades that have been damaged must be repaired or replaced, and this can be a lengthy and costly operation.

To limit erosion of the leading edges of the blades of rotating machines, and in particular of turbine blades, it has been proposed to apply an anti-wear coating to a portion of the outer part of the blade near its leading edge and over a fraction of the length of the leading edge, referred to the radial direction of the rotating machine.

Such coating or surfacing, which must be effective at a high temperature on the blade when machined to its finished state, can degrade the mechanical properties of the metal constituting the blade or lead to deformation of the blade due to thermal stresses occurring during high temperature coating.

It has therefore been proposed, in particular in U.S. Pat. No. 5,351,395, to protect a turbine blade against wear in the vicinity of its leading edge by attaching in the area of the leading edge, and welding to the body of the blade, an insert made of a hard material that is resistant to wear or of a material that is hardened by heat treatment differently than the material constituting the body of the turbine blade. The blade reinforcing insert is fixed to the body of the blade, which can be a precision casting. The insert, which is attached and fixed to a part of the body of the blade designed for this purpose, has a crude shape and must be machined to the shape and to the profile of the turbine blade in the vicinity of its leading edge.

After welding the reinforcing insert to the cast blank of the turbine blade body, the molded blank of the blade body is finish machined and the insert is machined to shape. Finally, hardening heat treatment is carried out to develop the hardness and wear resistance characteristics of the insert.

However, the cast blank of the blade body has a shape close to the final shape of the blade and in particular a twisted and curved shape. The insert must have a profile assuring continuity with the body of the blade in its area near the leading edge. Because of the complex shape of the body of the blade it can be very difficult to design and to make the insert, which has a significant effect on the cost of bimetallic turbine blades made by the above method.

SUMMARY OF THE INVENTION

It is an object of the invention to propose a method of manufacturing a bimetallic turbine blade having a body made of a first metallic material and an insert made of a second metallic material having a high resistance to wear, from which at least a part of a leading edge of the blade is made, the method enabling the bimetallic turbine blade to be manufactured in a simple manner and at moderate cost.

To this end:

- a receiving cavity having a simple geometrical shape is machined in a metallic block having a simple geometrical shape made of the first metallic material,
- a member having a simple geometrical shape made of the second material is made and fixed into the cavity to produce a composite bimetallic block, and
- the turbine blade is machined from the composite block, the body of the blade being machined from the metallic block made of the first material and the insert being machined from the member of simple shape made of the second material.

The member made of the second material can be prefabricated and then welded into the cavity.

The member made of the second material can instead be made by depositing and solidifying a molten metal in the cavity.

The metallic block made of the first material and the metallic member made of the second material preferably have a substantially parallelepiped shape.

BRIEF DESCRIPTION OF THE DRAWINGS

To explain the invention clearly, a bimetallic steam turbine blade and its manufacture by the method of the invention will now be described by way of example and with reference to the accompanying drawings.

DESCRIPTION OF PREFERRED EMBODIMENT

Figure 1:
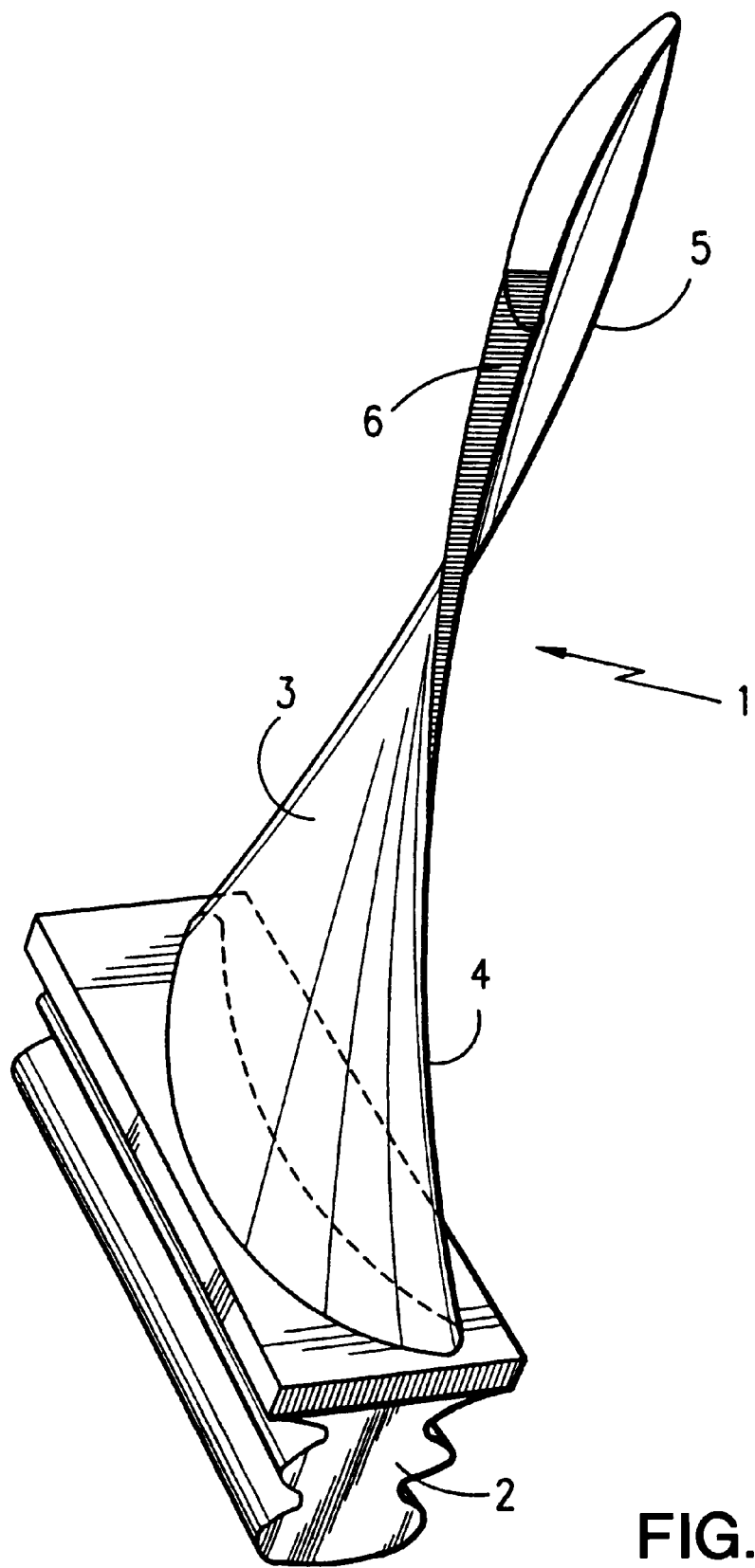
FIG. 1 is a perspective view of a bimetallic steam turbine blade.

FIG. 1 shows a steam turbine blade 1 that is preferably a blade of the low-pressure stage of the turbine.

The blade 1 has a root 2 having a profile enabling the turbine blade 1 to be fixed to a low-pressure rotor of the steam turbine and an aerofoil 3 attached to the root 2, generally unitary with the root 2, and having a complex, curved and twisted shape.

The aerofoil portion 3 of the blade 1 has a leading edge 4 and a trailing edge 5 where the aerofoil part 3 of the blade 1 has a minimal thickness. Between the leading edge 4 and the trailing edge 5, the cross-sections of the aerofoil part 3 of the blade have a tapered shape.

The turbine blade 1 shown in FIG. 1 is a bimetallic blade which includes an insert 6 constituting a portion of the aerofoil part 3 of the blade 1 near its leading edge 4 and extending radially in the outer part of the blade a certain length along the leading edge.

The bimetallic blade 1 has a one-piece body comprising the root 2 and the aerofoil part 3 except for a recess in which the insert 6 is accommodated and the insert accommodated in the recess and attached to the body of the blade 1.

The body of the blade 1 is made of a material appropriate to its use in the low-pressure stage of a steam turbine, for example stainless steel containing 13% chromium.

The insert 6 is made of a hard material that is resistant to wear, such as a cobalt-based alloy containing chromium and tungsten, for example grade 6 or grade 12 Stellite.

In accordance with the invention, a bimetallic turbine blade as shown in FIG. 1 can be made in a relatively simple manner and at a moderate cost by the method of the invention.

Figure 2:
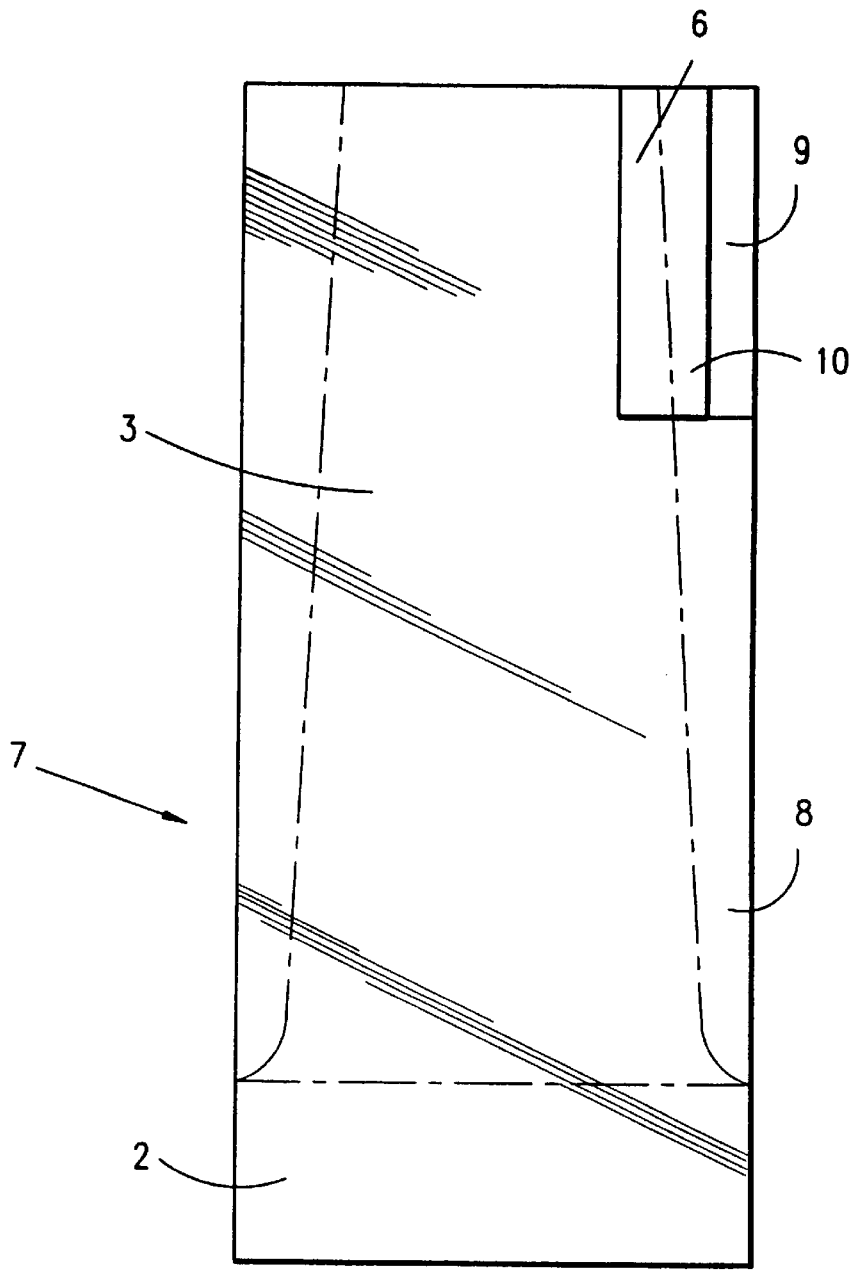
FIG. 2 is an elevation view of a composite metallic block for making a bimetallic turbine blade by the method of the invention.
Figure 3:
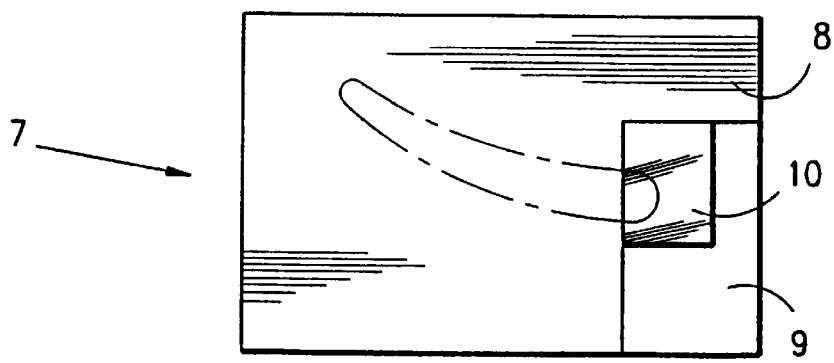
FIG. 3 is a plan view of the block shown in FIG. 2.

FIGS. 2 and 3 show a bimetallic composite metallic block 7 from which a bimetallic blade like that shown in FIG. 1 can be machined.

The bimetallic block 7 has a generally parallelepiped shape.

In the method of the invention, to make the bimetallic block 7, the first step is to machine a parallelepiped shape block 8 made of a first metallic material that is a standard material for manufacturing steam turbine blades. The starting block 8 can be made of steel containing 13% chromium, for example, and can be forged from a cast product such as an ingot. The block 8 could equally well be cut out from a half-finished product such as a rectangular section bar. The block 8 is machined to form a parallelepipedic shaped cavity 9 occupying one corner of the cross-section of the block 8 and extending in the direction of the height of the block 8 over a length substantially corresponding to the length of the insert 6 to be made along the leading edge of the bimetallic turbine blade being manufactured.

A parallelepipedic shaped member 10 is then cut out from a square section bar of a wear resistant material such as Stellite 6 or 12. Its height is substantially equal to the height of the cavity 9 in the block 8, and its section has dimensions smaller than those of the cross-section of the cavity 9. More generally, the member 10 can be obtained by cutting a constant profile product having any shape section.

The member 10 could also be made by casting or by forging a block with the requisite dimensions.

The prefabricated member 10 made of the wear resistent material is fitted into the inside corner of the cavity 9 so as to occupy all of its height. Clamps hold the block 8 and the member 10 in contact in their assembled position, as shown in FIGS. 2 and 3.

The assembly of the block 8 and the prefabricated member 10 placed in the cavity 9 is heated to a temperature in the range 550° C. to 780° C., for example, using an oxyacetylene torch.

The prefabricated member 10 and the block 8 are welded together using a filler metal or brazed together by maintaining the temperature of the parts to be jointed in the temperature range from 550° C. to 720° C.

The bimetallic block 7 obtained in this way is allowed to cool in air.

The welded or brazed joint obtained is then inspected by fluorescent dye penetration. The weld is repaired if necessary.

The bimetallic assembly is then subjected to a quality heat treatment (which modifies the characteristics of the material) to relieve the stresses due to welding on the attached part.

The turbine blade is then machined from the bimetallic block 7.

The contour of the bimetallic blade 1 machined from the bimetallic block 7 is shown in chain-dotted outline in FIGS. 2 and 3.

The body of the bimetallic blade 1 including the root 2 and the aerofoil part 3 of the blade, with the exception of the insert, is machined from the metallic block 8 made of steel containing 13% chromium.

The insert 6 disposed along the leading edge 4 of the blade is machined from the attached member 10 made of wear resistant alloy.

The turbine blade 1 is machined from the bimetallic block 7 in the same way as a standard single-metal metallic blade is machined from a homogeneous block.

The chain-dotted lines showing the contours of the blade 1 in FIGS. 2 and 3 show the machined surfaces of the blade in a longitudinal plane and in a transverse plane, respectively.

The metallic block 8 and the attached member 10 of course have dimensions optimized relative to the dimensions of the various parts of the bimetallic blade to be made in order to limit the volumes of materials to be removed when machining the bimetallic block. The cross-section of the metallic block 8 substantially corresponds to the section of the root of the blade to be made.

The machining of the bimetallic block includes a first machining operation to form the blank of the aerofoil part 3 and a second, finish machining operation on the aerofoil part 3. The blank of the root 2 is then machined and the root 2 is then finish machined, for example by means of a grinding operation.

Figure 4:
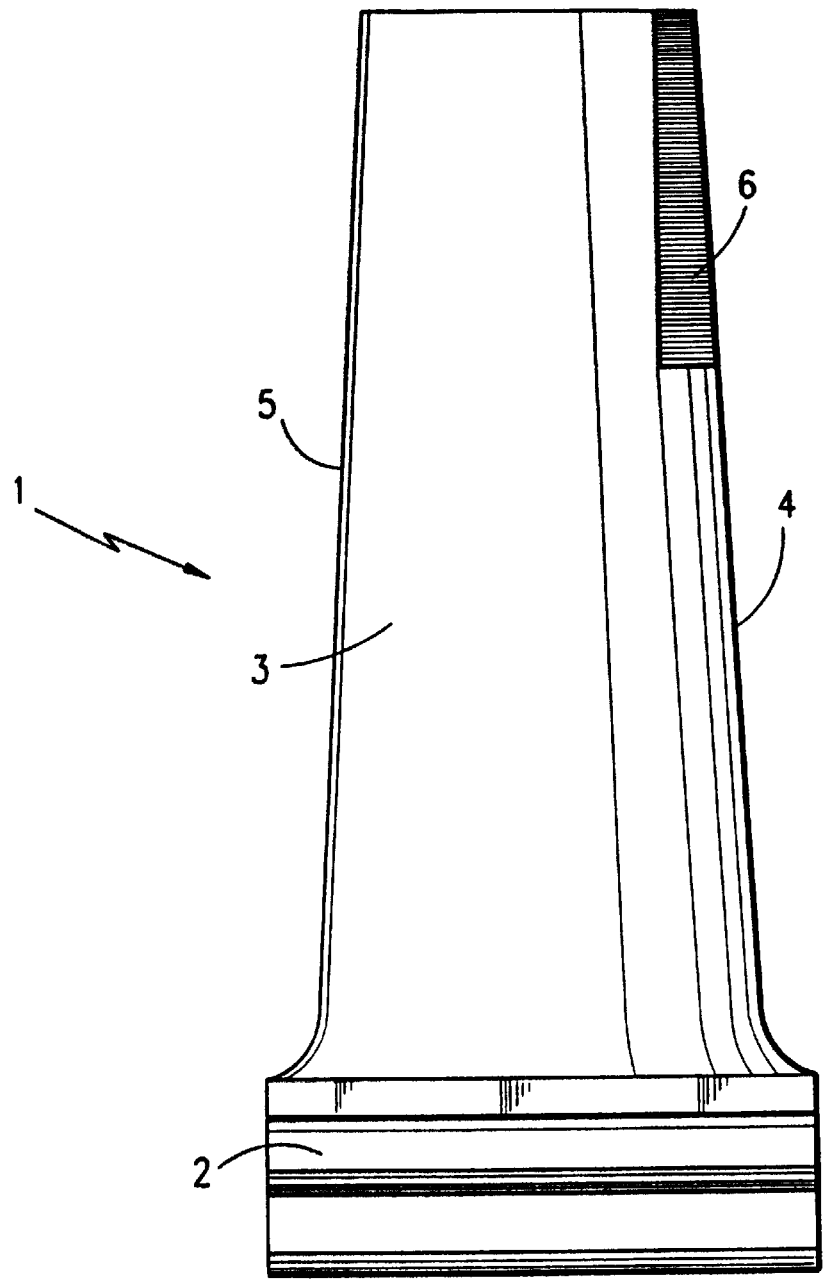
FIG. 4 is an elevation view of a bimetallic blade made by the method of the invention in the finished state.
Figure 5:
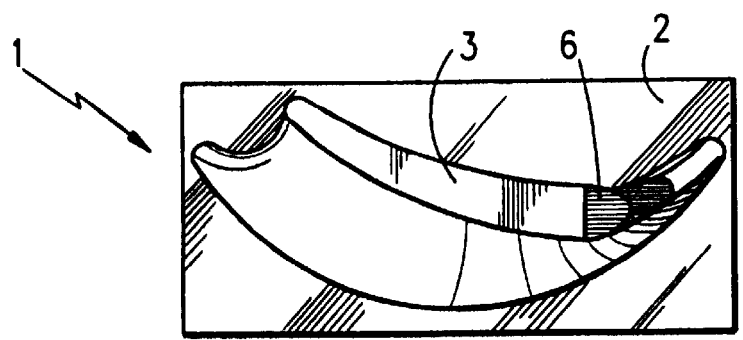
FIG. 5 is a top plan view of the turbine blade in the finished state shown in FIG. 4.

As shown in FIGS. 4 and 5, the finished blade 1 comprises a body consisting of the root 2 and an aerofoil part 3 made of stainless steel containing 13% chromium and an attached stellite member 6 welded to the body of the blade 1.

The attached member 6 is disposed in a part of the body of the blade 1 near the leading edge 4, part of which is machined in the attached member 6 and the remainder of which is machined in the body of the blade 1.

The attached member 6 constituting a part of the leading edge preferably covers approximately two-thirds of the leading edge 4 of the blade 1.

The bimetallic blade 1 as a whole has perfect cohesion and the curved surfaces delimiting the aerofoil part including the insert 6 are perfectly continuous because they are machined in the bimetallic part in a similar manner to the curved surfaces delimiting the aerofoil part of a single-metal blade machined from a part of homogeneous composition.

Also, the metallic block and the attached member of the bimetallic part having a simple geometrical shape can easily be obtained by casting, forging or from semifinished products having the required shape and section.

The attached member made of the second material can be made by depositing and solidifying a molten metal in the cavity of the metallic block made of the first material. The metal can be deposited by any surfacing or welding process involving fusion of a filler metal, such as the TIG process or the powder sputtering process.

In all cases, and for example after machining the turbine blade, it is possible to carry out a quality heat treatment to relieve the stresses and to check the dimensions of the machined turbine blade.

The metallic block consisting of the first material, the attached member and the cavity for receiving that member in the metallic block may have shapes other than a parallelepiped shape.

In all cases, however, the metallic block, the attached member and the cavity must have a simple geometrical shape, generally a right prism shape, to facilitate forming or making those members and assembling the bimetallic block.

The method of the invention is therefore entirely different from a method in which an attached member is fixed to a turbine blade blank of complex shape. In the case of the invention, the complex shape of the blade is obtained directly by machining the bimetallic blade, using a machining method similar to machining a turbine blade from a part of homogeneous composition.

The first material constituting the body of the turbine blade and the second material constituting the insert reinforcing the leading edge of the blade may be materials other than those indicated hereinabove by way of example.

For example, the body of the blade may be made from age hardened stainless steel or a non-ferrous alloy such as titanium alloy.

The attached reinforcing member may be made from stainless steel hardened by precipitation and/or containing hardening alloying elements. More generally, any metallic type material can be used that has a high resistance to wear, for example materials with hardening substances dispersed in a metallic matrix.

The invention applies to the manufacture not only of steam turbine blades but also of blades for any rotating machines such as gas turbines, compressors or pumps.

What is claimed is:

1. A method of manufacturing a bimetallic turbine blade including a body made of a first metallic material and an insert made of a second metallic material having a high resistance to wear, from which at least a portion of a leading edge of said blade is made, said method including the steps of
   (a) machining a receiving cavity having a simple geometrical shape in a metallic block having a simple geometrical shape made of said first metallic material;
   (b) making a member having a simple geometrical shape of said second material and fixing said member into said cavity, to produce a composite bimetallic block; and
   (c) machining said turbine blade from said composite block, a body of said blade being machined in said metallic block made of said first material and said insert being machined from said member of simple shape made of said second material.

2. The method claimed in claim 1, wherein said member made of said second material is prefabricated and then welded into said cavity.

3. The method claimed in claim 2, wherein said member of simple geometrical shape made of said second material is fixed into said cavity of said metallic block made of said first metallic material by welding with a filler metal or by brazing.

4. The method claimed in claim 2, wherein, before welding said member of simple geometrical shape made of said second material into said cavity of said metallic block made of said first material, said metallic block made of said first material and said member made of said second material are preheated.

5. The method claimed in claim 4, wherein said metallic block and said member are preheated and welded at a temperature in the range 550° C. to 780° C.

6. The method claimed in claim 2, wherein said prefabricated member having a simple geometrical shape made of said second material is obtained by cutting a constant profile product such as a bar.

7. The method claimed in claim 2, wherein, after welding said member made of said second material into said cavity in said metallic block made of said first material, a weld area between said member made of said second material and said metallic block made of said first material is inspected by dye penetration and said weld is repaired if necessary.

8. The method claimed in claim 1, wherein said member made of said second material is made by depositing and solidifying a molten metal in said cavity.

9. The method claimed in claim 1, wherein said metallic block made of said first metallic material, said member of simple shape made of said second metallic material and said cavity receiving said member have a substantially parallelepiped shape.

10. The method claimed in claim 1, wherein said metallic block made of said first metallic material is forged.

11. The method claimed in claim 1, wherein said first metallic material is stainless steel and said second metallic material is a wear resistant cobalt alloy containing chromium and tungsten.

12. The method claimed in claim 11, wherein said first material is stainless steel containing 13% chromium and said second material is grade 6 or grade 12 stellite.

13. The method claimed in claim 1, wherein after machining said turbine blade from said composite block a quality heat treatment is carried out to relieve stresses and the dimensions of the machined turbine blade are checked.

* * * * *